G. H. WHITTINGHAM.
CONTROLLING MEANS FOR ELECTRIC MOTORS.
APPLICATION FILED MAY 21, 1907. RENEWED DEC. 31, 1909.

965,674.

Patented July 26, 1910.

Witnesses

Inventor
G. H. Whittingham
By Robert Watson
Attorney

UNITED STATES PATENT OFFICE.

GEORGE H. WHITTINGHAM, OF BALTIMORE, MARYLAND, ASSIGNOR TO MONITOR MANUFACTURING COMPANY OF BALTIMORE CITY, A CORPORATION OF MARYLAND.

CONTROLLING MEANS FOR ELECTRIC MOTORS.

965,674.  Specification of Letters Patent.  Patented July 26, 1910.

Application filed May 21, 1907, Serial No. 374,899. Renewed December 31, 1909. Serial No. 535,902.

*To all whom it may concern:*

Be it known that I, GEORGE H. WHITTINGHAM, a citizen of the United States, residing at Baltimore, in the State of Maryland, have invented certain new and useful Improvements in Controlling Means for Electric Motors, of which the following is a specification.

My invention relates to means for regulating the admission of current to electric motors and it is particularly adapted for use in connection with motors which have to be frequently stopped and started and operated at various speeds.

In the present invention the speed regulation of the motor is accomplished by varying the field strength.

In carrying out the invention I provide means whereby the field of the motor receives full current strength and the armature receives the full starting current when the motor circuits are first connected to the supply circuits, and when the starting current falls to a safe predetermined quantity the sections of the starting resistance are successively cut out and at the same time sections of the regulating resistance are successively inserted in the field circuit, the cutting out of the starting resistance and the insertion of the regulating resistance being both controlled by the starting current. I also provide manually operated means which may be set so as to retain in the field circuit any desired amount of the regulating resistance after the automatic controller has operated, so that the speed of the motor will depend upon the position of said manually operated device which controls the amount of regulating resistance that is automatically inserted. The advantages of this arrangement for certain classes of work will be apparent from the following description.

Figure 1:
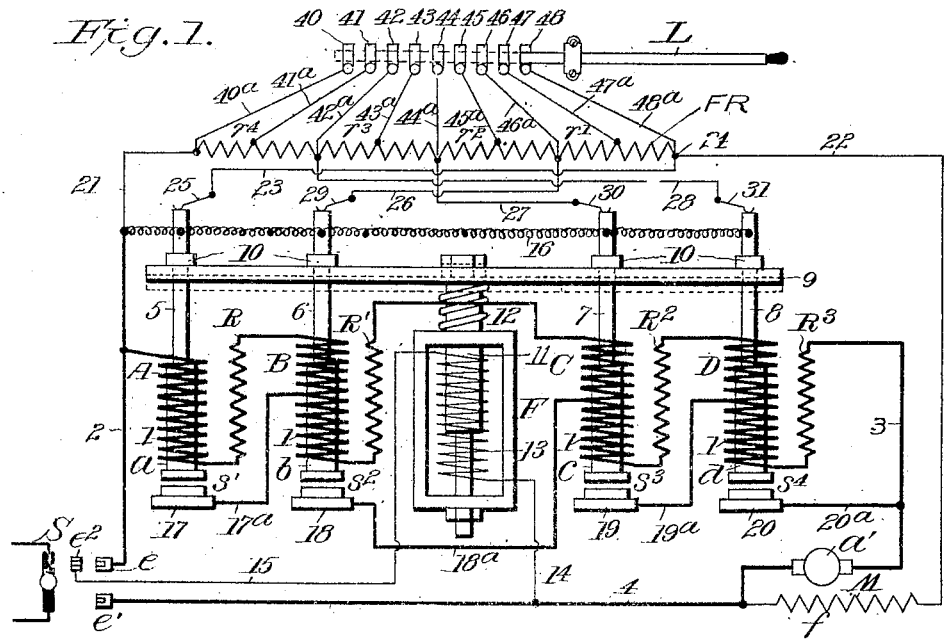
Figure 2:
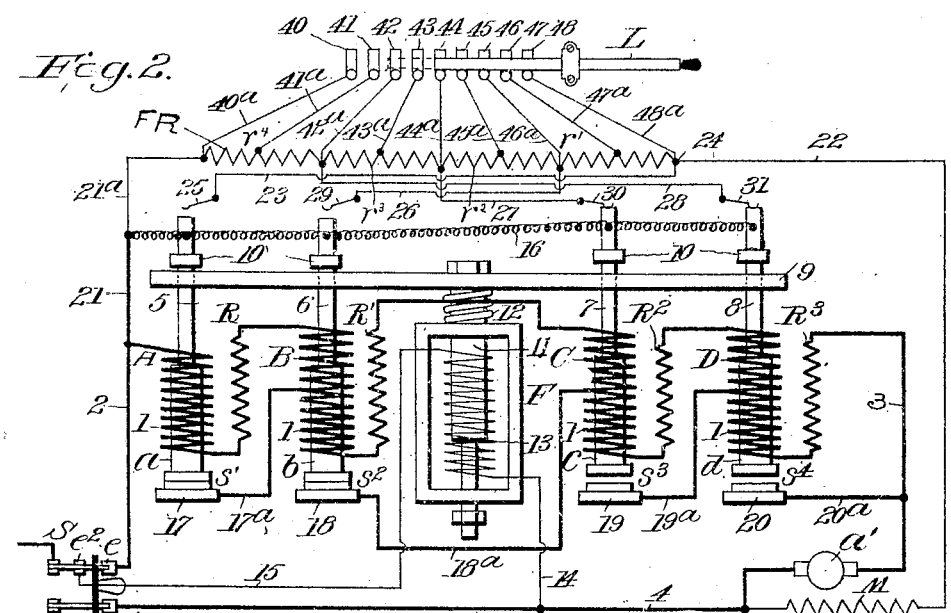

In the accompanying drawing Figure 1 is a side view of an automatic controlling device, the parts being shown in their normal positions, and the circuits being shown diagrammatically and, Fig. 2 is a similar view, illustrating the operation of the invention, the cores of two of the regulating solenoids being in their lower positions and the cores of the remaining two being in their upper positions.

Referring to the drawing M indicates an electric motor and S indicates a switch for admitting current to the motor windings to stop and start the motor. In series with the armature $a'$ of the motor are arranged the coils 1 of regulating solenoids A, B, C and D, and the steps or sections of starting resistance R, R′, $R^2$ and $R^3$. Thus, when the switch S is open and the parts are in their normal positions, shown in Fig. 1, the armature circuit extends from the terminal $e$ of the circuit closing switch S, by way of conductor 2 to one terminal of the coils of the solenoid A, and thence successively, through the coils of said solenoid, resistance R, coils of solenoid B, resistance R′, coils of solenoid C, resistance $R^2$, coils of solenoid D and resistance $R^3$ to conductor 3, thence through the armature $a'$ of the motor and thence through conductor 4 to the switch terminal $e'$. At the moment of closing the switch S therefore, the entire starting current will flow through the windings of said solenoids and through all of the resistance sections. The field circuit extends from the conductor 2 through conductor 21 and a field regulating resistance F R to conductor 22, thence to the field coils $f$ of the motor and by conductor 4 to the switch terminal $e'$. Normally the regulating resistance F R is short circuited, as will be hereinafter explained, so that at the moment when the switch S is first closed the field receives the full current strength.

The cores $a$, $b$, $c$ and $d$ of the regulating solenoids are normally supported in their most effective positions within the coils by metal rods 5, 6, 7, and 8 respectively which are secured to the cores and extend upwardly through openings in a supporting bar 9, said rods being provided with stops or collars 10 adapted to rest upon the bar. The bar is secured at its center to the core 11 of a solenoid F, and a spring 12 normally supports the cross-bar and the cores of all of the solenoids. The coils 13 of the solenoid F are connected to the terminal $e'$ of the switch S by conductors 14 and 4 and to an auxiliary terminal $e^2$ by conductor 15.

The cores $a$, $b$, $c$ and $d$ are electrically connected to the conductor 2 by a flexible conductor 16 which is grounded on the rods 5, 6, 7 and 8. Beneath the cores $a$, $b$, $c$ and $d$, are arranged contacts 17, 18, 19 and 20 which form the stationary members of switches $s'$, $s^2$, $s^3$ and $s^4$, respectively, the movable members of the switches being the solenoid cores. The stationary switch member 17 is connected by a conductor 17$^a$, to a point intermediate the ends of the coils of the solenoid B, and likewise the stationary switch members 18 and 19 are connected by conductors 18$^a$ and 19$^a$ to points intermediate the ends of the coils C and D, respectively. The stationary switch member 20 is connected by a conductor 20$^a$ to the conductor 3 leading to the armature. The solenoid A is wound so as to support its core as long as the starting current is above a given quantity and then to release its core when the current falls below said predetermined quantity. The solenoids B, C and D are wound so as to support their cores with less than said predetermined quantity flowing.

When the switch S is closed, current at once flows through all of the solenoids, and the solenoid F draws down its core, against the action of the spring 12, thus moving the cross-bar 9 into the position indicated in dotted lines in Fig. 1 and in full lines in Fig. 2, and leaving the cores of the regulating solenoids without mechanical support. If the starting current is sufficient to support the coil of solenoid A, which solenoid is weaker than the other regulating solenoids B, C and D, the cores of all of the regulating solenoids will remain supported until the starting current falls to the predetermined quantity at which it is desired to have the core of the solenoid A drop. When the current falls below this quantity the solenoid A will release its core, and the switch $s'$ will thereby be closed. The armature current will then flow from the conductor 2 through flexible conductor 16, rod 5, solenoid core $a$, switch $s'$ and conductor 17$^a$ to a point intermediate the ends of the coil of the solenoid B. The solenoid A, resistance section R and a portion of the coils of solenoid B will thus be short-circuited. The solenoid B will then be weakened, by reason of the short-circuiting of a portion of its windings, so that it will have about the same strength as the solenoid A, and after the temporary rise in current which follows the cutting out of the resistance section R, when the current falls to about the same pre-determined quantity as before the core of the solenoid B will drop and close the switch $s^2$, thus short-circuiting the remaining coils of the solenoid B and also short-circuiting the resistance section R$'$ and a portion of the windings of the solenoid C. The current will then pass from flexible conductor 16 through the rod 6, core $b$, switch $s^2$ and conductor 18$^a$ to a point intermediate the ends of the coils of solenoid C. In the same way, when the current again drops to the predetermined quantity the core of solenoid C will drop, closing the switch $s^3$, and cutting out the remaining windings of the solenoid C, the resistance section R$^2$ and the portion of the windings of solenoids D, and finally, the core of the solenoid D will drop, cutting out the last resistance section R$^3$. The current will then flow direct to the armature from flexible conductor 16 through rod 8, core $d$, switch $s^4$, conductor 20$^a$ and conductor 3.

When the switch S is opened the solenoid F is immediately deënergized, and the spring 12 raises the cross-bar 9, which in turn, lifts all of the cores of the regulating solenoids, and the switches $s'$ to $s^4$ inclusive are opened, thereby re-inserting all of the starting resistance and all of the windings of the regulating solenoids in series with the motor armature.

The field regulating resistance F R is normally bridged or short circuited by a conductor 23 which is joined at 24 to one end of the resistance and also connected to a spring contact 25 which normally bears upon the upper end of the rod 5. It will be seen that normally the field current will flow from the terminal $e$ of the switch S through conductors 2 and 16 and the rod 5 and contact 25 to the conductor 23 and thence to the conductor 22, the resistance F R being thus entirely short circuited. Intermediate points in the regulating resistance F R are connected by conductors 26, 27 and 28 to contacts 29, 30 and 31 which normally engage the rods 6, 7 and 8, respectively.

When the switch S is first closed, all of the regulating solenoids at that instant being in their upper positions, and the field regulating resistance being short circuited through the conductor 23, the field will receive its full current. But as the starting current in the armature circuit falls the solenoid A will release its core, and this will result in cutting out the first step R of the starting resistance, and it will break the circuit through the conductor 23 between the contact 25 and the rod 5, so that section $r'$ of the field regulating resistance, between the connecting points of the conductors 23 and 26, will be introduced into the field circuit (assuming the rod L, whose function will presently be described, to be in the position shown in Fig. 1), the field circuit then extending from the flexible conductor 16 through rod 6, contact 29, conductor 26 and resistance section $r'$ to the conductor 22 which leads to the field of the motor. No more of the field resistance can be cut into the field circuit until the starting current again falls to a safe predetermined quantity, when the core of the solenoid B will drop, thus short circuiting a section R$'$ of the starting resistance and interrupting the circuit through the conductor 26 at a point between the contact 29 and the rod 6. This will introduce another section, $r^2$, of the regulating resistance, between the connecting points of the conductors 26 and 27, into the field circuit. The current to the field will then flow from the flexible conductor 16 through the rod 7, contact 30, conductor 27 and resistance sections $r^2$ and $r'$ to the conductor 22. When the starting current again falls to the safe predetermined quantity, the core of the solenoid C will drop, cutting out the section $R^2$ of the starting resistance and breaking the connection between the rod 7 and the contact 30, so that the field current will then flow from the rod 8 through contact 31, conductor 28 and resistance sections $r^3$, $r^2$ and $r'$. In the same way, when the current again falls to the predetermined amount, the core of the solenoid D will drop, cutting out the final step $R^3$ of the starting resistance and breaking the circuit through the conductor 28 at the point between the rod 8 and the contact 31, so that another section $r^4$ of the starting resistance will be inserted in the field circuit. The field current will then flow from the wire 21 through all of the regulating resistance F R to the field coils of the motor. It will thus be seen that when the line switch S is closed the field receives full current, the field regulating resistance being normally short circuited, and the armature receives full starting current through the starting resistance which is normally in circuit; but whenever the starting current falls to a safe predetermined amount one section of the starting resistance will be cut out of the armature circuit and one section of the field resistance will be cut into the field circuit, this operation continuing step by step, until all of the resistance is cut out of the armature circuit and all of the regulating resistance is inserted in the field circuit.

When all of the field regulating resistance is in circuit and the starting resistance is cut out, the motor will operate at its highest speed, and the automatic devices above described are arranged to eliminate the starting resistance and all of the regulating resistance. In connection with the automatic controller I provide means adjustable by hand or at will for regulating the amount of resistance inserted in the field circuit by said automatic controller, so that after the controller has operated the motor will run at a speed depending upon the position upon which said manually operated device may be set. For this purpose I provide a series of contact pieces 40 to 48, inclusive, and the manually adjustable bar L, which may be set so as to engage all of said contacts, or to engage any less number. The contacts 42, 44, 46 and 48 are connected by wires $42^a$, $44^a$, $46^a$ and $48^a$, respectively, to the terminals of the resistance sections $r^4$, $r^3$, $r^2$ and $r'$, and the intermediate contacts 41, 43, 45 and 47 are connected by wires $41^a$, $43^a$, $45^a$ and $47^a$ to intermediate points of said resistance sections.

If the rod L is set in the position shown in full lines in Fig. 1, wherein it does not bridge any of said contacts, when the switch S is closed the starter will operate, as previously described, to cut out all of the starting resistance and insert all of the field resistance, step by step; but if the rod L is set in the position shown in dotted lines, in Fig. 1, so as to electrically connect the contacts 40 and 48, then when the starter operates it will not insert any of the field resistance, because the latter is then entirely short-circuited through the wire $40^a$, bar L, contact 48 and wire $48^a$. In one case the motor will operate at its highest speed, and in the other it will operate at its lowest speed. If a speed between the highest and the lowest is desired, the contact bar L is set in an intermediate position. Thus, in the position of the bar L, shown in full lines in Fig. 2, the bar connects the contacts 44 and 48, and as these contacts are connected by the wires $44^a$ and $48^a$ to the center and right hand end of the regulating resistance the two resistance sections $r^2$ and $r'$ are short-circuited through the bar. When the first and second solenoids, A and B, release their cores, they will not insert any resistance in the field circuit notwithstanding the interruption of the circuits through conductors 23 and 26, as shown in Fig. 2, as the current can still flow directly to the field from the flexible conductor 16 to the rod 7 of the solenoid C, thence through contact 30, conductors 27 and $44^a$ to the contact 44, and thence through bar L, contact 48, and wire $48^a$ to the wire 22 which leads to the field. The field will thus receive full current strength until the core of solenoid C drops. This will break the circuit through conductor 27, at the contact 30. The field current will then flow from flexible conductor 16 to rod 8, contact 31, conductor 28, through section $r^3$ of the regulating resistance to the wire $44^a$, and thence through the bar L to the conductors $48^a$ and 22. When the solenoid D drops its core, the circuit through conductor 28 will be broken, and the current to the field will then flow from conductor 21 through sections $r^4$ and $r^3$ of the regulating resistance, and thence through wire $44^a$, bar L, and wire $48^a$ to wire 22 which leads to the field. The motor will then run with two sections of the regulating resistance in the field circuit. Similarly, if the bar L is set so as to engage all of the contacts from 42 to 48, inclusive, as indicated in dotted lines in Fig. 2, and the starting switch S is then closed, the three resistance sections, $r^3$, $r^2$ and $r'$ being short-circuited by the bar, the first three solenoids, A, B and C will operate in succession without introducing any resistance into the field circuit, as the current can flow from conductor 16 to rod 8, thence through conductors 28 and $42^a$ to contact 42, and thence through the bar and conductors $48^a$ and 22. When the solenoid D drops its core the circuit through conductor 28 is broken and the current then flows from conductor 21 through the section $r^4$ of the regulating resistance to the conductor $42^a$ and thence through the bar L. The field will thus receive full current strength up to the time when the core of the last solenoid in the series drops, and then one section of regulating resistance only will be inserted in the field.

If it is desired to leave only one-half of a resistance section in circuit after the starter has operated, the bar may be set so as to engage all of the contacts from 41 to 48, inclusive. This will short-circuit all of the resistance between the points of connection of the wires $41^a$ and $48^a$, namely sections $r'$, $r^2$, $r^3$ and a part of section $r^4$. Then full field strength will be maintained until the solenoid D drops its core, when the circuit to the bar L, through conductors 28 and $42^a$ will be broken, and the current will then flow from conductor 21 through part of resistance section $r^4$ to conductor $41^a$, thence through the bar to the field. If it is desired to have all of the field resistance inserted except half of a section, the bar will be set so as to bridge only the contacts 47 and 48. Then the field will receive full current strength through conductor 23 until the first solenoid A drops its core. Current will then flow from conductor 16 to rod 6, conductor 26, through part of resistance section $r'$ to conductor $47^a$, and thence through bar L and wires $48^a$ and 22 to the field, and as the cores of the other solenoids drop in succession, the sections of resistance, $r^2$, $r^3$ and $r^4$ will be successively added to the field circuit. If desired the intermediate contacts 41, 43, 45 and 47 and their connecting wires may be dispensed with, leaving only the contacts 40, 42, 44, 46 and 48 which are connected to the ends of the field resistance sections; or the number of intermediate connections and contacts may be increased to suit the desired number of changes in speed.

The invention is particularly designed for controlling motors which are used to operate individual printing presses and some forms of shop tools. In operating printing presses, for some classes of work the press should operate faster than on others; but for any given job the press should always run at the same speed until the job is finished, in order that the inked form may be pressed against the paper for the same length of time during each impression, so as to make the work uniform in appearance. It is also desirable for the operator to be able to stop and start the motor any desired number of times without changing the speed of the motor. With my improvements the switch S may be located convenient to the operator of the printing press or the machine which it is desired to operate, so that he may start and stop the same as often as desired, while the bar L, by which the speed is set, may be at a distance from the operator and under the control of the foreman, who may thus at will, set the bar to get the desired speed for any particular job. The operator of the press or other machine, in such case, can not change the speed to suit his own desires. If the motor starts quickly the automatic controller acts quickly, and conversely; but in any event, the starting resistance cannot be cut out nor the regulating resistance inserted while the starting current remains above the safe predetermined amount, which it is desirable to admit to the motor for starting purposes, and when the starter operates it will cut into the field circuit the entire regulating resistance, a part of said resistance, or it will not cut in any of said resistance, depending upon the position in which the hand regulator is set.

The invention is particularly intended for use in connection with motors which are designed for low normal speeds and which permit of field regulation for speeds above the normal. Usually such motors are started by first cutting out the starting resistance while the field has its full strength, and then cutting in the field resistance. This necessitates moving the field regulator each time the motor is stopped and started, and where it is desired to run at a given speed, and to stop and start frequently, the field regulator must always be brought back to the same position by the operator in order to obtain the same speed. This requires time and attention on the part of the operator, and a careless operator will frequently neglect to set the regulator in the proper position, or he will adjust the speed to suit himself instead of suiting the speed to the work. With my invention, however, the person whose business it is to stop and start the motor need have nothing to do with the field regulator, and when the latter is set for a given speed the motor will always operate at that speed regardless of the number of times the motor is stopped and started. The current controlled regulator will always cut out the starting resistance and at the same time cut in the required amount of regulating resistance, and these operations take place just as quickly as the load on the motor will admit of, so that no time is wasted in these operations. This is an important consideration in cases where the motor has to be stopped and started frequently.

What I claim is—

1. In a controlling apparatus for electric motors having shunt field windings, resistances arranged in the armature and field circuits, means controlled by the starting current arranged to cut resistance out of the armature circuit step by step and to automatically insert resistance in the field circuit step by step while the resistance is being cut out of the armature circuit.

2. In a controlling apparatus for electric motors having shunt field windings, resistances arranged in the armature and field circuits, means controlled by the starting current arranged to cut resistance out of the armature circuit step by step and to automatically insert resistance in the field circuit step by step while the resistance is being cut out of the armature circuit and means adjustable at will for regulating the amount of resistance inserted in the field circuit by said automatic means.

3. In a controlling apparatus for electric motors, a starting resistance in the armature circuit, a regulating resistance in the field circuit, and means controlled by the starting current for automatically cutting resistance out of the armature circuit and for automatically cutting resistance into the field circuit while the starting resistance is being cut out.

4. In a controlling apparatus for electric motors, a starting resistance in the armature circuit, a regulating resistance in the field circuit, means controlled by the starting current for automatically cutting resistance out of the armature circuit and for automatically cutting resistance into the field circuit while the starting resistance is being cut out and means adjustable at will for regulating the amount of regulating resistance cut into the field circuit by said automatic means.

5. In a current regulating apparatus for electric motors, a regulating resistance for the field circuit, and a starting resistance in the armature circuit, and automatic current controlled means adapted to maintain said starting resistance in circuit and to maintain said regulating resistance out of circuit while the starting current is above a predetermined quantity, and to cut out sections of the starting resistance and insert sections of the regulating resistance when the starting current falls below said predetermined quantity.

6. In a current regulating apparatus for electric motors, a regulating resistance for the field circuit, and a starting resistance in the armature circuit, automatic current controlled means adapted to maintain said regulating resistance out of circuit while the starting current is above a predetermined quantity, and to cut out sections of the starting resistance and insert sections of the regulating resistance when the starting current falls below said predetermined quantity, and means adjustable at will for short-circuiting various portions of the field regulating resistance.

7. In a current regulating apparatus for electric motors, a regulating resistance in the field circuit, a circuit for shunting said resistance and means for automatically maintaining said shunt circuit closed while the starting current in the armature circuit is above a predetermined quantity and for opening said shunt circuit when the current falls below said quantity.

8. In a current regulating apparatus for electric motors, a regulating resistance in the field circuit, a circuit for shunting said resistance, means for automatically maintaining said shunt circuit closed while the starting current in the armature circuit is above a predetermined quantity and for opening said shunt circuit when the current falls below said quantity, and a device adjustable at will for short circuiting portions of said resistance.

9. In a current regulating apparatus for electric motors, a regulating resistance in the field circuit and a starting resistance in the armature circuit, a switch for opening and closing the motor circuits, a plurality of electro-magnetic regulating devices having their windings in series with the armature and adapted to operate in succession and automatically cut out the starting resistance step by step when the switch is closed, and a series of normally closed circuits in shunt to successively smaller portions of the regulating resistance, said regulating devices being arranged to open said shunt circuits in succession while the starting resistance is being cut out.

10. In a current regulating apparatus for electric motors, a regulating resistance in the field circuit and a starting resistance in the armature circuit, a switch for opening and closing the motor circuits, a plurality of electro-magnetic regulating devices having their windings in series with the armature and adapted to operate in succession and automatically cut out the starting resistance step by step when the switch is closed, a series of normally closed circuits in shunt to successively smaller portions of the regulating resistance, said regulating devices being arranged to open said shunt circuits in succession while the starting resistance is being cut out and a device, adjustable at will, for short-circuiting any desired amount of the regulating resistance.

11. The combination with a motor, and a switch for starting and stopping the same, of a starting resistance normally in series with the motor armature, a plurality of electro-magnetic regulating devices having their coils in series with the armature and adapted to automatically cut out said starting resistance step by step when said switch is closed, and connections whereby said devices operate to progressively weaken the field of the motor as the starting resistance is cut out.

12. The combination with a motor, and a switch for starting and stopping the same, of a starting resistance normally in series with the motor armature, a plurality of electro-magnetic regulating devices having their coils in series with the armature and adapted to automatically cut out said starting resistance step by step when said switch is closed, connections whereby said devices operate to progressively weaken the field of the motor as the starting resistance is cut out, and means adjustable at will for regulating the degree to which the field strength is weakened by the operation of said devices.

13. The combination with a motor, and a switch for starting and stopping the same, of a starting resistance normally in series with the motor armature, a plurality of electro-magnetic regulating devices having their coils in series with the armature and adapted to automatically cut out said starting resistance step by step when the switch is closed, a regulating resistance for the field circuit, and connections whereby said devices operate to progressively insert resistance in the field circuit as the starting resistance is cut out.

14. The combination with a motor, and a switch for starting and stopping the same, of a starting resistance normally in series with the motor armature, a plurality of electro-magnetic regulating devices having their coils in series with the armature and adapted to automatically cut out said starting resistance step by step when the switch is closed, a regulating resistance for the field circuit, connections whereby said devices operate to progressively insert resistance in the field circuit as the starting resistance is cut out and means, adjustable at will, for regulating the amount of regulating resistance inserted in the field circuit by the operation of said devices.

15. In a controlling apparatus for electric motors, a switch for opening and closing the motor circuits, a starting resistance in the armature circuit, a regulating resistance in the field circuit, automatic controlling means having windings in series with the armature adapted to cut out the starting resistance and insert the regulating resistance while the starting resistance is being cut out when said switch is closed, and to re-insert the starting resistance and cut out the regulating resistance when said switch is opened, and means, adjustable at will, for regulating the amount of regulating resistance inserted in the field circuit by said automatic means.

In testimony whereof I affix my signature, in presence of two witnesses.

GEORGE H. WHITTINGHAM.

Witnesses:
JAMES J. MCGRATH,
RANDOLPH BARTON, Jr.